(12) United States Patent
Kiefer et al.

(10) Patent No.: US 8,424,342 B2
(45) Date of Patent: Apr. 23, 2013

(54) MELTING AND REFINING IN TANKS WITH COOLED WALLS

(75) Inventors: Werner Kiefer, Mainz (DE); Hildegard Römer, Flörsheim (DE); Frank-Thomas Lentes, Bingen (DE); Guido Räke, Rümmelsheim (DE); Volker Ohmstede, Mainz (DE); Karin Naumann, Ober-Olm (DE); Michael Leister, Budenheim (DE); Gerhard Nuessle, Jena (DE); Erich Rodek, Mainz (DE); Wolfgang Schmidbauer, Mainz (DE)

(73) Assignee: Schott AG, Mainz (DE)

( * ) Notice: Subject to any disclaimer, the term of this patent is extended or adjusted under 35 U.S.C. 154(b) by 981 days.

(21) Appl. No.: 10/552,103

(22) PCT Filed: Mar. 31, 2004

(86) PCT No.: PCT/EP2004/003416
§ 371 (c)(1),
(2), (4) Date: Jul. 27, 2006

(87) PCT Pub. No.: WO2004/087587
PCT Pub. Date: Oct. 14, 2004

(65) Prior Publication Data
US 2006/0291528 A1    Dec. 28, 2006

(30) Foreign Application Priority Data
Apr. 2, 2003 (DE) ................................. 103 14 955

(51) Int. Cl.
*C03B 18/18* (2006.01)

(52) U.S. Cl.
USPC ....... 65/29.19; 65/29.17; 65/29.21; 65/134.1; 65/134.2; 65/135.1; 65/135.2; 65/135.3; 65/135.6; 65/135.7; 65/135.8; 65/135.9

(58) Field of Classification Search ................. 65/29.17, 65/29.19, 29.21, 134.1, 134.5, 135.1, 135.2, 65/135.3, 135.6, 135.7, 135.8, 135.9
See application file for complete search history.

(56) References Cited

U.S. PATENT DOCUMENTS 3,811,860 A * 5/1974 Nier .............................. 65/134.4
4,133,969 A * 1/1979 Zumbrunnen ................ 373/113

(Continued)

FOREIGN PATENT DOCUMENTS

DE    1211363    2/1966
DE    10003948    8/2001

(Continued)

OTHER PUBLICATIONS

International Search Report dated Jul. 18, 2003.

(Continued)

*Primary Examiner* — Queenie Dehghan
(74) *Attorney, Agent, or Firm* — Ohlandt, Greeley, Ruggiero & Perle, LLP.

(57) ABSTRACT

A method for melting inorganic materials, preferably glasses and glass-ceramics, in a melting unit with cooled walls is provided. The method includes selecting the temperature of at least one region of the melt is selected in such a way as to be in a range from $T_{eff}-20\%$ to $T_{eff}+20\%$, where the temperature $T_{eff}$ is given by the temperature at which the energy consumption per unit weight of the material to be melted is at a minimum, with the throughput having been selected in such a way as to be suitably adapted to the required residence time.

28 Claims, 8 Drawing Sheets

U.S. PATENT DOCUMENTS

| | | | |
|---|---|---|---|
| 4,246,433 A | 1/1981 | Seifried et al. | 273/232 |
| 5,738,811 A * | 4/1998 | Gagel et al. | 264/82 |
| 7,137,277 B1 * | 11/2006 | Romer et al. | 65/134.3 |
| 7,694,533 B2 * | 4/2010 | Rodek et al. | 65/135.6 |
| 2001/0039812 A1 * | 11/2001 | Romer et al. | 65/134.1 |
| 2002/0023463 A1 * | 2/2002 | Siebers et al. | 65/99.5 |
| 2002/0112507 A1 * | 8/2002 | Nattermann | 65/134.1 |
| 2002/0162358 A1 * | 11/2002 | Jeanvoine et al. | 65/134.5 |

FOREIGN PATENT DOCUMENTS

| | | |
|---|---|---|
| DE | 10138108 | 2/2003 |
| EP | 1078889 | 8/2000 |
| FR | 1306851 | 1/1962 |
| KR | 2002050331 | 6/2002 |

OTHER PUBLICATIONS

K.F.E. Williams et al., "Characterization of tin at the surface of float glass," vol. 242, pp. 183-188, Journal of Non-Crystalline Solids, Jun. 1998.

* cited by examiner

Fig. 1A
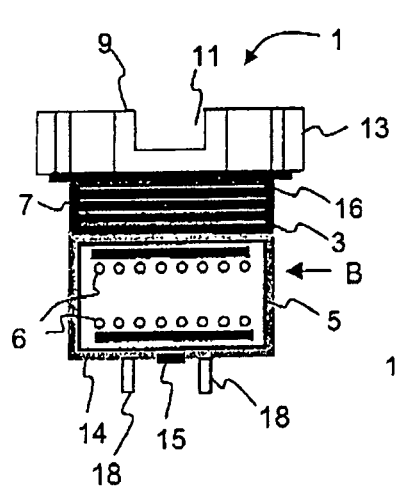
Fig. 1B
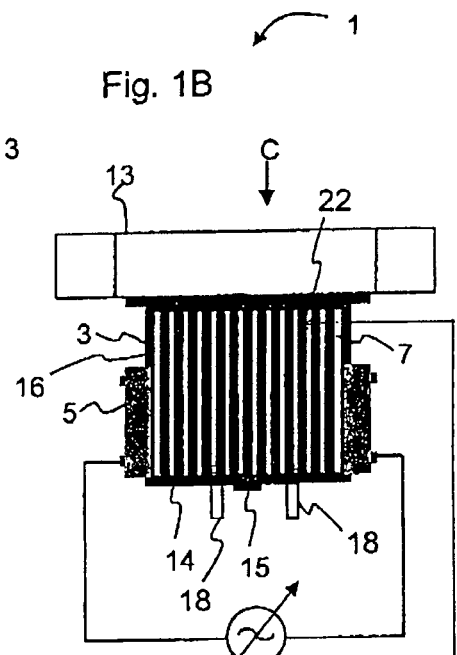
Fig. 1C
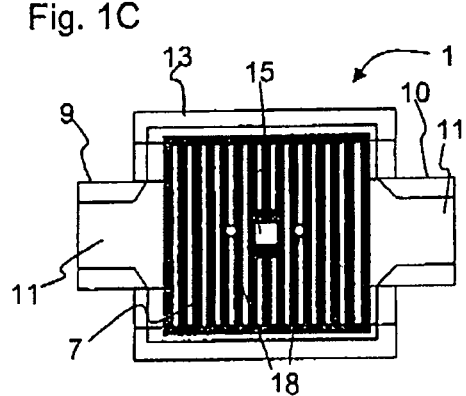

MELTING AND REFINING IN TANKS WITH COOLED WALLS

CROSS-REFERENCE TO RELATED APPLICATIONS

This application claims the benefit under 35 U.S.C. §365 of International Application No. PCT/EP2004/003416, filed Mar. 31, 2004, the entire contents of which are incorporated by reference herein.

BACKGROUND OF THE INVENTION

1. Field of the Invention

The invention relates to a method and an apparatus for melting and/or refining, in particular in melting or refining units with cooled walls.

It is an object of the invention to provide a method and an apparatus with reduced energy consumption when melting and/or refining inorganic substances, preferably glasses, glass-ceramics and crystals. The invention is preferably to be used in a melting or refining unit with cooled walls, for example in a skull crucible or a conductively heated tank.

2. Description of Related Art

The prior art has described a range of melting units with cooled walls, in particular skull crucibles, which are used to melt glasses using radiofrequency.

In the present context, a radiofrequency-heated skull crucible is to be understood as meaning a crucible which is formed from cooled metal tubes and is surrounded by a radiofrequency coil. There are gaps between the metal tubes, allowing the radiofrequency energy to be introduced directly into the glass melt.

In the present context, a conductively heated tank or a conductively heated crucible is to be understood as meaning a tank or crucible in which heat is supplied at least in part by direct or alternating currents introduced by means of electrodes.

The melting of glasses in a skull crucible brings a number of advantages, on account of the formation of a skull layer of the same type of material as the glass on the cooled metal tubes. High-purity and/or very aggressive and/or high-melting glasses can be melted down and kept molten in a skull crucible.

High-melting glasses which only melt at temperatures over 1600 to 1700° C. can be melted in a melting unit with cooled walls, since the skull layer of material of the same type as the glass is constantly reformed even at high temperatures, thereby providing protection against external impurities.

Also, when melting chemically highly aggressive glasses, a skull layer of material of the same type as the glass is formed, preventing the glass melt from attacking the cooled metal tubes.

When melting high-purity glasses, the skull layer of the same type of material as the glass in particular also prevents crucible material dissolved by the glass melt from entering the glass melt. Since oxidized constituents of the cooled metal tubes, such as in particular metal ions, can diffuse in very small quantities through the skull layer, if the purity requirements are extremely stringent, it is necessary to use special metal tubes, such as for example metal tubes made from platinum metals, aluminum tubes or plastic-coated metal tubes.

However, melting in a melting unit with cooled walls, such as for example a skull crucible, has the drawback that the method is very energy-consuming, since the walls have to be very strongly cooled in order to cool the walls and/or produce a skull layer of the same type of material as the glass, and consequently a very large amount of energy is withdrawn from the glass melt.

The temperature difference between the heated melt and the cooler wall region is in this respect a direct measure of the energy loss through dissipation of heat. This temperature difference increases at higher melting or refining temperatures, and consequently the energy loss through dissipation of heat is also increased at the same time.

Since both radiofrequency energy and fed-in conductive currents are expensive energy carriers, for example compared to fossil fuels, the abovementioned melting and refining methods have the reputation of being expensive and energy-consuming. In particular an additional increase in temperature, by analogy with conventional tanks, was regarded as a direct measure of additional costs.

With conventional melting tanks, it is attempted to keep the dissipation of heat through the walls and the floor, i.e. the energy loss, as low as possible by using good thermal insulation of the melting tanks.

The energy loss per unit weight $E_V$ is dependent on the throughput. Assuming the same grade of glass, an increase in throughput is generally associated with an increase in temperature.

Conventional tanks with walls made from metallic or ceramic refractory materials can only be heated to the temperature which is permissible for the refractory materials; for metallic refractory materials, such as for example platinum metals, no higher than 1500° C., and for ceramic refractory metals no higher than 1600° C., or in exceptional cases up to at most 1700° C. for brief periods of time.

With conventional tanks, therefore, the maximum melting temperature is determined by the refractory materials used. By determining the maximum melting temperature, the refractory materials also predetermine the maximum throughput.

Furthermore, with conventional tanks, there may be problems with introducing the energy required to increase the temperature into the tank, since the higher burner temperature attacks the roof to a greater extent, and in the case of additional electrical heating the electrodes are extensively attacked.

The increase in temperature is also associated with an increase in the convection of the glass melt in the melting tank, which in turn leads to a considerably greater attack on the tank.

An increased attack on the tank firstly shortens the service life of the tank and secondly has an adverse effect on the quality of glass. Therefore, in conventional tanks, an increase in the throughput always entails the risk of a deterioration in the glass quality as a result of melting relics. In the case of a gas-fired tank, a higher glass temperature at the same time also means a higher top furnace temperature. This is associated with increased production of environmentally harmful nitrogen oxides, $NO_x$, in the atmosphere. Many tanks are already running at the currently applicable limits.

Consequently, with conventional tanks there are very tight limits on increasing the throughput by increasing the temperature, and consequently it is not appropriate to do so from an energy perspective.

When melting in a melting unit with cooled walls, such as for example a skull crucible, for the same melting temperature the heat loss per unit area is very much higher than the energy loss per unit area with the well thermally insulated walls of a conventional tank.

Furthermore, the energy loss as the temperature increases rises to a greater extent with a skull crucible than with conventional tanks, as explained above. This significantly higher energy loss from the melting units with cooled walls compared to the conventional tanks is the reason for melting in units with cooled walls, such as for example melting in skull crucibles, being relatively uncommon.

Despite having considerable advantages over conventional tanks, the skull melting method has hitherto only been used where conventional melting methods have failed.

BRIEF SUMMARY OF THE INVENTION

The object of the invention is to find a method and an apparatus with which on the one hand the major advantages of a melting unit with cooled walls are retained, while on the other hand it is possible to considerably reduce the energy demand per unit weight of finished molten material which occurs when melting in tanks with cooled walls.

According to the invention, this object is achieved in a very surprising way by a method and by an apparatus according to the present invention.

The inventors have discovered, in a very surprising way, that the energy consumption per unit weight of molten glass $E_{tot}$ can be considerably reduced in a melting unit with cooled walls, for example in a skull crucible, if the temperature T of the melt is increased and the residence time t of the melt in the melting unit V is shortened.

The method according to the invention for melting inorganic materials, preferably glasses and glass-ceramics, in a melting unit with cooled walls accordingly provides that
material to be melted is fed to the melting unit and heated by supplying heating energy, in which method
the temperature $T_{eff}$, described in more detail below, at which the energy consumption per unit weight of the material to be melted, given a suitably adapted throughput, is at a minimum is determined, and
the temperature of the melt in the melting unit is selected in such a way as to be in a range from $T_{eff}$-20% to $T_{eff}$+20%, and
the throughput is selected in such a way as to be adapted to the required residence time.

In a corresponding way to the method of the invention, an apparatus according to the invention for melting inorganic materials, preferably glasses and glass-ceramics, which can be used in particular also to carry out the method according to the invention, comprises
a melting unit with cooled walls,
a device for supplying material to be melted,
a device for the direct heating of a melt,
a device for setting a temperature which is at least $T_{eff}$-20% to $T_{eff}$+20% in at least one region of the melt, the temperature $T_{eff}$ being given by the temperature at which the energy consumption per unit weight of the material to be melted, with a throughput which is suitably adapted to the residence time required at a given temperature, is at a minimum, and
a device for adapting the relative throughput of material to be melted to the required residence time in the melt.

The inventors have experimentally discovered that the energy consumption per unit weight $E_{tot}$, as the temperature increases, initially drops and passes through a minimum before rising again at even higher temperatures. The temperature at which the energy consumption per unit weight $E_{tot}$ reaches its minimum is referred to below as $T_{eff}$.

The following relationship applies at temperature $T_{eff}$ $$\frac{dE_{tot}}{dT}\bigg|_{T=T_{eff}} = 0 = \frac{dE_N}{dT}\bigg|_{T=T_{eff}} + \frac{dE_V}{dT}\bigg|_{T=T_{eff}} \quad (1)$$

$T_{eff}$ can, for example, be determined from experimental values, as explained in more detail below with reference to the examples.

In this context, $E_{tot}$ stands for the total energy consumption per unit weight of molten glass and is composed of the useful heat per unit weight $E_N$ and the energy loss per unit weight $E_V$.

As an alternative to $T_{eff}$, it is also possible, in a first approximation, to determine the temperature at which the energy loss per unit weight has dropped to the value of the useful heat per unit weight. Accordingly, for this purpose the temperature at which $$E_V = E_N \quad (2)$$

is determined.

Moreover, it is preferable for thermal energy to be fed directly to the melt or for energy to be converted into thermal energy directly in the melt. This can be achieved, for example, by direct conductive heating and/or by direct inductive heating by means of suitable devices.

The processes which take place in the melt are dependent on the absolute temperature. Accordingly, the range $T_{eff}$-20% to $T_{eff}$+20% is based in particular on the absolute temperature.

In the present context, the term relative throughput is to be understood as meaning the throughput D [mass/unit time] based on the quantity of melt V*ρ in the melting unit, where V denotes the volume of the melt and ρ denotes the density of the melt. Consequently, the following applies to the relative throughput $D_{rel}$:

$$D_{rel} = D/(V^*\rho) = 1/t. \quad (3)$$

In this equation, t denotes the mean residence time.

The relative throughput therefore has the dimension of a reciprocal time.

The residence time required is determined by the result which is to be achieved by the method. According to one embodiment of the invention, the method is used to melt down batch, so that in this case the required residence time accordingly comprises the melt-down time.

According to a further embodiment, the method is used to refine melting material, so that the required residence time comprises the time required for refining. It is also possible for both melting down and refining to be carried out in one unit with cooled walls. In this case, the required residence time accordingly comprises the time required for melting down and refining. The required residence time is also to be understood as meaning the mean residence time of the material to be melted in the melting unit.

The range from $T_{eff}$-20% to $T_{eff}$+20% proves particularly expedient for the energy consumption per unit weight of the material to be melted.

At very high throughputs or with very short holding times of the melt in the melting unit, it is not just the physical processes, such as for example the rate at which the bubbles rise during refining, which play a role, but also the chemical reactions, in particular the kinetics with which the thermodynamic equilibria are established in the melt. Increasing the temperature of the glass melt steps up not just the physical processes, for example the rate at which the bubbles rise up, but also the kinetics with which the thermodynamic equilibria are established, for example as a result of the higher diffusion rate of the gases to the refining bubbles. Acceleration of the kinetics at high temperatures allows a sufficiently high increase in throughput, so that the increased energy loss per unit weight at higher temperatures is more than compensated for by the adapted increase in throughput. This requires a heating method which can supply sufficient heating energy to the melt to enable at least a region of the melt to be brought to the intended temperature despite the cooling of the walls.

The text which follows provides a more detailed explanation of the method on the basis of a somewhat simplified situation. For the sake of clarity, units for some variables are given in square brackets; by way of example, the unit kilograms [kg] was selected for the weight, the unit hours [h] was selected for the time, the unit kilowatts [kW] was selected for the power and the unit kilowatt hours [kWh] was selected for the energy.

The inventors have discovered that given correct and extensive consideration, an energy-saving melt in units with cooled walls is possible if, when melting glasses, a distinction is drawn between useful heat, on the one hand, and energy loss, on the other hand. The total energy consumption per unit weight of molten glass $E_{tot}$ is composed of the useful heat per unit weight $E_N$ and the energy loss per unit weight $E_V$.

$$E_{tot}=E_N+E_V. \tag{4}$$

The term useful heat per unit weight, $E_n$, is to be understood as meaning the quantity of heat per unit weight of molten glass which has to be fed to a glass batch and/or charge cullet for heating and melting.

The useful heat per unit weight comprises:
the quantity of heat per unit weight for heating the batch and/or charge cullet: $E_{N1}=C_{p1}*\Delta T_1$, where $\Delta T_1$ denotes the temperature difference between the starting temperature and the melting or transition temperature,
the latent heat per unit weight: $E_{N2}=\Delta H$, and
the quantity of heat per unit weight for heating the glass melt to the desired process temperature:
$E_{N3}=C_{p2}*\Delta T_2$. Here, $\Delta T_2$ denotes the temperature difference from the melting or transition temperature to the selected process temperature, which according to the invention in at least a region of the melt is in a range from $T_{eff}-20\%$ to $T_{eff}+20\%$.

The latent heat $\Delta H$ comprises the heat of reaction and/or the heat of phase transition during melting or during the glass transition of the melting material, which is added, for example, in the form of batch and/or charge cullet.

For a first approximation, the specific heat capacity of the melting material below the melting or transition temperature $c_{p1}$ and the specific heat capacity of the melting material above the melting or transition temperature $c_{p2}$ can be assumed to be equal, so that:

$$c_{p1}=c_{p2}=c_p. \tag{5}$$

The following then results for $E_N$:

$$E_N=C_p*\Delta T+\Delta H, \text{ where } \Delta T=\Delta T_1+\Delta T_2. \tag{6}$$

The useful heat, in particular the useful heat required for refining, is therefore directly proportional to the throughput and the melting temperature. The useful heat per kg of molten glass $E_N$ is independent of the melting time and the melting method.

On the other hand, the energy loss is dependent on the melting method.

An energy loss occurs in particular as a result of:
the radiation of heat at the glass surface,
the dissipation of heat through the walls and the floor of melting vessel, and
the dissipation of heat from the hot gases if gas or oil heating is used.

The simplified consideration inter alia does not take account of the contribution of the radiation of heat to the energy loss.

The energy loss per unit time indicates what quantity of heat is lost per unit time kWh/h. The energy loss per unit time is therefore an energy power loss kWh/h=kW.

The energy loss per unit weight, taking account of the throughput, indicates what quantity of heat is lost per unit weight $E_V$.

The energy loss or the energy loss per unit weight are dependent on the melting unit used.

The energy loss resulting from the radiation from the glass surface depends firstly on whether the surface is uncovered or covered by a carpet of batch or a carpet of bubbles. The radiation of heat at the glass surface is considerably reduced if the surface of the glass melt is covered with a carpet of batch or a carpet of bubbles. On the other hand, the heat which is radiated from the glass surface is reflected back by the roof of the melting tanks. The loss of heat through the surface results from the loss of heat through the wall of the roof.

In the case of conventional tanks and in the case of melting units with cooled walls and radiofrequency or conductive heating, the energy loss per unit area resulting from the radiation of heat at the surface is substantially equal for the same temperature and surface coverage.

In the case of gas or oil firing, in conventional tanks an additional factor is the heat loss resulting from the hot gas flowing out.

Unlike with conventional tanks, in which the upper melting temperature is limited by the attack on the tank, when melting in melting units with cooled walls there are not really any restrictions imposed on the melting temperature by the attack on the tank.

Surprisingly, the inventors have discovered that in the case of a melting unit with cooled walls, such as for example a skull crucible, contrary to current opinion, the energy consumption per unit weight can be reduced if the melting temperature is increased, despite the higher energy loss through the wall and the floor and the higher useful energy required to heat the melt, if the holding time of the melt in the melting unit is shortened in accordance with the increased reaction rate.

The energy loss through the wall and the floor is dependent on the heat transfer k [kW/cm$^2$*K], the temperature of the melt [T] and the cooled wall surface area F [cm$^2$] of the melting unit.

In melting units, the ratio of surface area to volume of the melt changes with the volume of the melting units. This ratio is referred to below as $F_0$, with the supposed surface area substantially representing the surface area of the melt which is in contact with the cooled walls of the melting unit $$F_0=F/V[1/m]. \tag{7}$$

Therefore, it is also possible for the surface area/volume factor $F_0$ times the melt volume V to be used instead of the surface area F.

The relationship $$\text{Energy loss}=k*T*F=k*T*F_0*V \tag{8}$$

can be assumed as a simplified representation of the energy loss through the walls $E_V$.

For a predetermined melt volume, the energy loss per unit weight $E_V$ is additionally dependent on the throughput D (kg/h), so that the following result for $E_V$:

$$E_V=k*T*F*1/D \text{ [kWh/kg] or} \tag{9}$$

$$E_V=k*T*F_0*V*1/D \text{ [kWh/kg]}. \tag{10}$$

The throughput D of the melt, or the relative throughput $D_{rel}$, is defined by the residence time t of the melt in the volume V of the melting unit.

$$D=V*\rho/t \text{ (kg/h)}; D_{rel}=V*\rho/t*(V*\rho)=1/t \quad (11)$$

$$1/D=t/(V*\rho); 1/D_{rel}=t. \quad (12)$$

From this, the following results for $E_V$:

$$E_V=k*T*F*1/V*1/\rho*t \text{ [kWh/kg]}, \quad (13)$$

or, using equation (5):

$$E_V=k*T*F_0*V*1/V*1/\rho*t, \text{ or} \quad (14)$$

$$E_V=k*T*F_0*1/\rho*t \text{ [kWh/kg]}. \quad (15)$$

The required residence time τ of the melt in the melting unit V is dependent on the respective reaction rate, for example the dissolution rate of the batch or the rate at which the refining bubbles rise up. For the sake of simplicity, a constant E, which corresponds to a characteristic activation temperature, can be applied to τ:

$$\tau=\tau_0*e^{+E/T} \quad (16)$$

In the above, $\tau_0$ denotes the required residence time at a reference temperature $T_0$. On the basis of this, if the required residence time τ is adapted to the mean residence time t or the relative throughput $D_{rel}=1/t$, so that accordingly t=τ, $E_V$ is:

$$E_V=k*T*F_0*1/\rho*\tau_0*e^{+E/T} \quad (17)$$

The energy consumption per unit weight $E_{tot}$ of the material to be melted is firstly dependent on the residence time of the material to be melted in the melting unit. Furthermore, the required residence time is temperature-dependent. For example, the refining takes place more quickly at high temperatures, and the residence time which is required to obtain the desired result, for example a refined melt, is shortened.

Surprisingly, the inventors have discovered that increasing the melting temperature, with the associated faster reaction rate in the melt, results in an energy contribution $E_{tot}$ which drops as the temperature rises, even though more energy has to be used to cool the walls of the melting unit and to heat the melt.

The change in the energy consumption per unit weight $E_{tot}$ with the temperature is equal to the change in the useful heat per unit weight $E_N$ with the temperature plus the change in the energy loss per unit weight $E_V$ with the temperature.

$$dE_{tot}/dT=dE_n/dT+dE_V/dT \quad (18)$$

The change in the useful heat per unit weight with the temperature $dE_N/dT$ is constant for the heating of the melt and is by definition equal to $c_p$.

The useful heat per unit weight rises linearly with the temperature:

$$E_N=c_p*\Delta T+\Delta H \quad (19)$$

$$dE_n/dT=c_p \text{ (kWh/kg*K)} \quad (20)$$

This means that to reach a higher temperature, more useful heat per unit weight is required to heat the melt.

The following applies to the temperature dependency of the energy loss per unit weight:

$$E_V=k*T*F_0*1/\rho*\tau_0*e^{+E/T} \quad (21)$$

$$dE_V/dT=d(k*T)/dT*F_0*1/\rho*\tau_0*e^{+E/T}+ \\ k*T*F_0*1/\rho*\tau_0*d(e^{+E/T}/dT. \quad (22)$$

Surprisingly, the inventors have discovered that the heat transfer k between 1700° C. and 2400° C. rises only linearly if a skull layer is present, and consequently d(k*T)/dT is equal to k. Therefore, $$dE_V/dT=k*F_0*1/\rho*\tau_0 e^{+E/T}+ \\ k*T*F_0*1/\rho*\tau_0*(-E/T^2)*e^{+E/T} \quad (23)$$

results for $dE_V/dT$.

Furthermore, the inventors have experimentally discovered that $dE_V/dT$ decreases as the temperature rises. The reason for this is the considerable increase in the reaction rate with the temperature and, as a corollary to this, the considerable drop in the required residence time τ for the melt in the melting unit.

The rise of $E_N$ with the temperature and the drop in $E_V$ with the temperature mean that an optimum, at which the energy consumption per unit weight $E_{tot}$ is at a minimum, is reached at a temperature $T_{eff}$.

$$\left.\frac{dE_{tot}}{dT}\right|_{T=T_{eff}}=0=\left.\frac{dE_N}{dT}\right|_{T=T_{eff}}+\left.\frac{dE_V}{dT}\right|_{T=T_{eff}}$$

According to one embodiment of the invention, the device for the conductive heating of the melt comprises cooled electrodes. The use of cooled electrodes of this type allows the melt to be heated to high temperatures which even exceed the application limit temperatures for the appropriate electrode materials, so that a temperature which is favorable for a low energy consumption can be established. Electrodes and melting units of this type for the direct conductive heating of melts are also described in the two earlier German applications bearing application numbers 102 56 657.7 and 102 56 594.5, the content of disclosure of which in this respect is hereby also incorporated in full in the subject matter of the present application.

The preferably large-area electrodes may advantageously be inserted into cutouts in cooled walls of the unit.

The melt can be heated with the aid of the cooled electrodes using alternating current from 50 Hz to 50 kHz, preferably from 2 kHz to 10 kHz. The electrode surfaces may advantageously be dimensioned such that the current density for heating the melt is no more than 5 A/cm² anywhere on the electrodes. According to a preferred refinement of this embodiment, the electrodes have at least one, preferably two cooling circuits which can be used to control their cooling. Air and water can preferably be used as cooling medium.

A melting unit with conductive heating, or a refinement of the method according to the invention with conductive heating, are also suitable for melts whereof the electrical conductivity is lower than $10^{-1}\Omega^{-1}cm^{-1}$ for example for melts with an electrical conductivity in the range from $10^{-3}$ $\Omega^{-1}cm^{-1}$ or preferably from $10^{-2}$ $\Omega^{-1}cm^{-1}$ to $10^{-1}$ $\Omega^{-1}cm^{-1}$.

To enable melts in melting units with cooled walls to be heated to temperatures of over 1600° up to $T_{eff}$, it is necessary for the cooled electrodes to be installed directly in the cooled walls of the melting unit.

According to the invention, the large-area electrodes, which form part of the cooled walls, include at least one controllable cooling system. It is preferable for the electrodes to include a double-controllable cooling system, e.g. one for gas cooling and one for liquid cooling. The large-area cooled electrodes can be installed both in the walls of skull crucibles and in cooled ceramic walls.

It has been found that even in the case of the melting units according to the invention with cooled walls, which are directly conductively heated using alternating current, if the melting temperature is increased, the increase in the introduction of energy on account of the increase in the electrical conductivity is higher than the increase in the heat loss through the cooled walls and the increase in useful heat used to increase the melting temperature.

According to one embodiment of the invention, the device for the radiofrequency heating of the melt in a melting unit with cooled walls comprises a skull crucible which is surrounded by a radiofrequency coil. The skull crucible is formed from cooled metal tubes. There are gaps between the metal tubes, with the result that the radiofrequency can be introduced directly into the glass melt.

Skull crucibles heated by radiofrequency are described, for example, in patents DE 199 39 781, DE 199 39 772, DE 100 02 019, DE 199 39 779, DE 100 41 757 or DE 199 39 780, the content of disclosure of which in this respect is hereby incorporated by reference in full in the present description and included in the subject matter thereof.

Furthermore, the method is particularly preferably carried out as a continuous method, in which case melting material is continuously fed to and removed from the melt by means of suitable devices. The material to be melted which is supplied can be supplied both in solid form as a batch and already in the form of a melt. Melting material is preferably removed in molten form.

The inventors have discovered that the drawbacks which arise when the temperature is increased in conventional tanks on account of the chemical attack on the tank material can be avoided when melting in units with cooled walls. The walls of the melting unit have to be cooled sufficiently for there no longer to be any corrosion to the walls, even with very high convection in the glass melt.

When melting in a melting unit with cooled walls, there are then scarcely any limits imposed by the walls on the extent to which the temperature can be increased.

The inventors have also discovered that when using melting units with cooled walls, it is worthwhile heating the melt not just to the temperature $T_{kon}$ which is required for the melting-down or refining process, but rather to a significantly higher temperature, and increasing the throughput in accordance with the shorter residence time required. According to one embodiment of the invention, it is in this context provided that at least a region of the melt be heated to more than 1700° C.

Although the energy loss in a crucible with cooled walls, such as for example a skull crucible, rises as the temperature increases, it has surprisingly been discovered that this rise when the melting temperatures are increased is slower than the rise in the energy or power saving resulting from an increased throughput.

The chemical reactions and physical processes during melting-down and refining in many cases have a process rate which is exponentially dependent on the temperature, whereas the temperature dependency of the dissipation of heat through the cooled walls is substantially dependent only on the wall surface area of the melting unit and the temperature difference, and surprisingly increases relatively slowly as the temperature rises.

The inventors have discovered that by increasing the temperature of the melt to above $T_{kon}$, the physical processes and chemical reactions in the melting unit are accelerated to such an extent that it is possible to increase the throughput per unit volume in a melting unit with cooled walls to such an extent that as the melting temperature T increases, the energy loss per unit weight $E_V$ decreases, i.e. the energy gain or the reduction in the energy loss resulting from the increase in throughput is far greater than the additional energy consumption which is required to increase the temperature of the melt and to hold the melt at the higher temperature in the melting unit.

On account of the increase in the throughput as the temperature rises, to beyond $T_{kon}$, the energy loss per unit weight $E_V$ decreases continuously until the temperature $T_{eff}$ is reached.

The energy consumption per unit weight $E_{tot}$, i.e. the sum of energy loss per unit weight $E_V$ in particular through the walls and the floor and the useful heat per unit weight $E_N$ required to heat the melt, as has already been explained above, passes through a minimum at $T_{eff}$, provided that the throughput is suitably adapted to the required residence time t.

However, if the minimum is exceeded in the direction of higher temperatures, the energy consumption per unit weight $E_{tot}$ as a function of temperature only rises again very slowly, whereas below the minimum at lower temperatures there is a strong drop in $E_{tot}$ toward $T_{eff}$ as a function of the temperature.

Accordingly, the effect of energy saving as the temperature rises is very great in the range below $T_{eff}$.

It may also be advantageous to operate a unit above $T_{eff}$, in order, on account of the slow rise in the energy consumption in this range, to allow a high throughput to be processed very quickly with only slightly increased energy costs. In this case, however, the outlay on equipment is also greater. Consequently, operation at a temperature below or up to $T_{eff}$, i.e. in a range from $T_{eff}-20\%$ to $T_{eff}$, is preferred. It may also be the case that the desired temperature $T_{eff}$ may not be reached. This depends, inter alia, on the composition of the melt. If the melt contains constituents which start to evaporate below $T_{eff}$, the melt can only be heated up the evaporation temperature $T_{verd}$ of the corresponding constituent of the melt without major changes in the desired composition of the molten glass. If $T_{verd}$ is lower than $T_{eff}$, only part of the maximum possible energy saving potential can be realized. The temperature $T_{eff}$ also cannot be reached if it is not possible to supply sufficient thermal energy to the system.

In many cases, the maximum energy saving is in a first approximation reached at a temperature at which the useful heat per unit weight $E_N$ required to increase the melting temperature is equal to the energy loss per unit weight $E_V$.

According to one embodiment of the invention, therefore, it is possible to select a temperature less than or equal to this temperature, at which the useful heat per unit weight and the energy loss per unit weight are equal.
$(E_N=E_V)$ Since the drop in the energy loss per unit weight with the temperature is steeper than the rise in useful heat per unit weight, the maximum energy saving is slightly above the temperature at which the useful heat per unit weight $E_n$ is equal to the energy loss per unit weight $E_V$.

To determine the temperature $T_{eff}$,
  the useful heat per unit weight required to heat the melt,
  the energy loss from the installation or the heat loss through
    the walls and the floor, and
  the increase in throughput
are determined as a function of the temperature.

The change in the useful heat per unit weight required to heat a glass melt with temperature can be determined from the specific heat $C_p$ of the glass melt, as has already been mentioned above.

The specific heat capacity $c_p$ of glass melts is between 1 and 2 kJ/(kg*K), for example 1.175 kJ/(kg*K) for soda-lime glass and 1.5 kJ/(kg*K) for an aluminosilicate glass for the production of glass-ceramic.

The change in the energy loss through the wall as a function of temperature can be measured, for example, directly by measuring the temperature of the cooling liquid which is used to cool the walls as a function of the temperature.

The change in throughput with the temperature depends on the required holding time t for the melt in the melting volume. The change in the throughput with the temperature can either be determined directly by experimental means or can be determined by the change in the reaction rate with the temperature.

To adapt the relative throughput of material to be melted to the required residence time t in the melt, it is possible on the one hand to adapt the absolute quantitative throughput or on the other hand to maintain a desired absolute quantitative throughput and to adapt the melting volume or the dimensions of the unit accordingly. This is advantageous, for example, if the unit is part of a production line with a predetermined quantitative throughput.

The size of the melting unit for the intended throughput can be determined from the throughput at the temperature $T_{eff}$.

If the size of the melting unit is reduced rather than the throughput being increased at $T_{eff}$, the energy loss per unit weight increases, and therefore so does the energy consumption per unit weight to some extent, since the surface area factor $F_0$ increases to some extent.

Of course, it is also possible for the absolute throughput and the size of the unit to be adapted together.

However, the increase in the throughput or the reduction in the size of the melting units with cooled walls can only be realized to an extent which is such that the residence time t of the melt in the melting unit with cooled walls is still sufficient for the melt to be heated and/or the required processes, such as for example the rising up of bubbles, to take place.

The energy consumption per unit weight $E_{tot}$ in the case of melting units with cooled walls is in part determined by the additional useful heat per unit weight $E_N$ required to heat the melt from the temperature $T_{kon}$ to the temperature $T_{eff}$. This means that the energy saving in melting units with cooled walls increases the lower the temperature $T_{eff}$.

Accordingly, an additional energy saving is possible if, by additional measures, the increase in throughput per temperature interval can be increased and consequently the temperature $T_{eff}$ can be shifted to lower temperatures. Since the temperature $T_{eff}$ is influenced by the time-integrated cooling power, the value of $T_{eff}$ is greatly influenced by the required residence time, which for its part determines the relative throughput.

Therefore, the method according to the invention may advantageously also comprise suitable measures for shortening the required residence time for a predetermined temperature and quality.

Shortening the required residence time or increasing the throughput reduces the energy loss per unit weight and therefore shifts the temperature $T_{eff}$ toward lower temperatures.

The residence time can be effectively shortened, inter alia, if the melt is additionally mixed, thereby increasing the reaction rate.

One possible way of doing this is to generate a convective flow in the melt. The inventors have discovered that when refining melts, the increase in throughput when the melting temperature rises depends not only on the very greatly increased rate at which bubbles rise up, as described, for example, in DE 199 39 779, but also on the shift in the thermodynamic equilibrium of the chemical reactions and the considerable increase in the reaction kinetics for establishing the thermodynamic equilibrium.

As a result of the direct irradiation of energy into the melt and the cooled walls, for example the skull walls in a skull crucible, when heating using radiofrequency or alternating current, higher temperature differences are present than in a conventional tank. The high temperature difference seeks to balance itself out by convection.

Furthermore, the inventors have discovered that the required residence time can be significantly reduced by setting a viscosity of $<10^3$ dPas, preferably of $<10^2$ dPas, in at least a region of the melt, and a melt temperature difference between an inner region of the melt and an outer region of the melt of >150 K, preferably >250 K. Consequently, with these temperature and viscosity ratios in the melt, the convection in the crucible increases to a very considerable extent. For example during refining, this causes in particular small bubbles to be entrained by the convection, so that they reach the surface much more quickly than through simple physical buoyancy.

Moreover, in the case of continuous refining, as disclosed for example by DE 100 41 757, in which molten material can be introduced into a crucible from one side of the crucible at the melt bath surface and can be discharged again on an opposite side at the melt bath surface. It is thus possible, with the assistance of a convective flow in the crucible, to produce a flow profile which leads to the cold melt which enters on one side flowing downwards in the unit, where it is heated and then rises up again and flows off on the other side without major turbulence. This form of orbital flow in the unit allows the refining to be additionally greatly accelerated and consequently the throughput to be additionally increased. The small bubbles are entrained by this flow and are therefore carried to the surface much more quickly than would be the case by virtue of their buoyancy alone.

The required residence time can advantageously also be shortened, inter alia, if the melt is agitated using a stirrer and/or by bubbling. In the case of bubbling, gas is introduced into the melt using one or more nozzles, in particular in the region of the base of the crucible used, in which case the melt is agitated by the gas bubbles rising. Additional agitation is advantageous, inter alia, if the viscosity of the melt is above $10^3$ dPas. In this case, the convection of the melt in the melting unit is often insufficient to stir batch into the glass melt.

With regard to the refining, the method according to the invention also has the advantages that, firstly, it consumes less energy at high melting temperatures between $T_{kon}$ and $T_{eff}$ than at $T_{kon}$, and secondly, it is particularly suitable for high-temperature refining agent.

The inventors have discovered that increasing the melting-down temperature makes it possible to accelerate the chemical reactions in the melting unit to such an extent that it is possible for the batch to be stirred into the melt without the subsequent quality of the melted material being adversely affected.

As a result of the batch being stirred in, it is also possible to prevent decoupling of the melt close to the surface even when large amounts of batch are added.

Even when melting down batch, by increasing the melting-down temperature, compared to the temperatures used in conventional melting-down methods, from $T_{eff}-20\%$ to $T_{eff}+20\%$, the melting rate of the batch and therefore the throughput can be increased to such an extent that the energy loss per unit weight associated with the increase in temperature is significantly lower than the energy saving per unit weight achieved by the increased melting-down rate of the batch and the resulting increased throughput.

With conventional glass melting tanks, the limits imposed on the extent to which the melting-down temperature can be increased are even tighter than in the case of refining. For example, the attack on the tank by the batch which is being melted down is generally greater than the attack on the tank by the glass melt. To keep the attack on the tank in the melting-down region within acceptable limits, the melting-down temperature in tanks of this type must not be selected to be too high. Moreover, the glass melt generally also has to be refined after it has been melted down. To refine the glass melt, the temperature of the glass melt has to be increased after the melting-down, in order to release the refining agent. However, the higher refining temperature, as described above, is also limited by the attack on the tank.

In the case of conventional tanks, the batch is generally placed onto the surface of the glass bath in the form of a carpet of batch and melted from below. Only a relatively low convection is present in conventional tanks. Furthermore, with conventional tanks it is not customary for the batch to be stirred down, since there is a risk of unmelted batch constituents passing into the end product. Furthermore, the increased convection caused by stirring in the melting-down part would extensively attack the bricks of the tank. A high level of convection at the three-phase boundary is particularly critical in connection with batch. Unlike conventional tanks, melting using cooled walls permits high convection, since either the skull layer in the case of a skull crucible is constantly renewed or the walls of the melting unit are cooled to such an extent that there is no reaction between the wall and the melt which causes wall material to be dissolved even with a high level of convection.

Unlike with conventional tanks, in the case of melting units with cooled walls which are heated directly, there is no obstacle to increasing the temperature in order to accelerate the melting process.

According to an advantageous refinement of the invention, material to be melted can also be supplied in the form of batch which is placed onto the surface of the melt. When melting in a skull crucible, the throughput which can be achieved depends, inter alia, on the rate at which the batch can be placed onto the glass melt and how quickly the batch melts down below the surface.

When melting down batch in a melting unit with cooled walls and direct heating of the melt by radiofrequency or alternating current, in general, in particular at low melting-down temperatures, it must be ensured that the batch is not placed too quickly onto the surface of the melt, since otherwise the upper layer of the melt can be cooled to such an extent by the batch that the melt is decoupled in this region, which considerably slows down the melting.

By increasing the temperature of the melt, this risk can be considerably reduced, so that the batch can be added more quickly without any possible risk of this decoupling phenomenon.

Even if the melting unit with cooled walls is used as a melting-down unit, increasing the melting-down temperature accelerates the chemical reactions and therefore accelerates the melting-down of the batch.

If, as is customary with conventional tanks, the batch is only placed onto the surface of the glass melt, the batch is only melted at the interface between batch and melt. If the temperature is increased, an increased chemical reaction acts in particular at this interface between batch and melt.

The energy saving caused by the increase in the melting rate at higher temperatures in accordance with this refinement of the invention is greater than the energy loss resulting from heating and holding the glass melt at the higher temperature.

However, at this point it should be noted that the acceleration of the melting-down rate through an increase in temperature is also dependent to a considerable extent on the composition of the batch, since the individual constituents of the batch generally have different activation energies for melting-down.

However, the inventors have discovered that the increase in the melt-down rate with temperature is of the same order of magnitude as the increase in the refining rate. For example, it has been found that beyond a temperature at which the viscosity of the melt is <$10^3$ dPas, preferably <$10^2$ dPas, and the temperature difference between an inner region and an outer region of the melt is >150 K, preferably >250 K, the melt-down rate also rises considerably in the melting unit when material to be melted is supplied in the form of batch.

As described above, the sudden rise in the melt-down rate is attributable to a considerable rise in the convective flow in the melt. Increasing the temperature of the melt on the one hand reduces the viscosity of the melt and on the other hand produces the temperature difference between the edge of the crucible and the middle of the crucible. The temperature difference between the edge of the crucible and the middle of the crucible is also highly dependent on the radiation transmission of the melt, for example in the glass melt. The temperature difference is higher in the case of dark glasses than in the case of highly transparent glasses. The greater the temperature difference in the melt, the more the melt seeks to compensate for the difference. If the viscosity of the melt drops to <$10^3$ dPas, preferably to <$10^2$ dPas, strong convection starts to occur in the melt. In particular in the case of dark glasses, by way of example, in most cases it is sufficient to lower the viscosity to <$10^3$ dPas, whereas in the case of highly transparent glasses the strong convection often only starts at a viscosity of the glass melt of <$10^2$ dPas. The reason for this is thought to be the greater temperature difference which is built up in the case of dark glasses for the same temperature of the glass melt.

The considerable increase in the convection brings about considerably better mixing of the interface between batch and glass melt and thereby melts down the batch more quickly. The high convection alone can lead to intermediate mixing of the melt with the batch.

Furthermore, the inventors have discovered that the high level of convection at higher temperatures also considerably increases the shear forces at the batch which is to be dissolved, and therefore likewise leads to considerably quicker melting-down of the batch.

As has already been described in connection with the refining of the melt, when heating melting units with cooled walls using radiofrequency or alternating current, the direct radiation of energy into the melt produces high temperature differences, which can lead to strong convection in the melt. This convection in the melting unit with cooled walls additionally accelerates the melting of the batch and therefore shortens the required residence time and consequently, if the throughput is suitably adapted, further reduces the energy consumption per unit weight of the material to be melted.

The batch can advantageously also be stirred into the melt in order to further shorten the required residence time. In this case, the stirring-in of the batch, like the above-described agitation of the melt, can be effected by means of a stirrer or by bubbling. Stirring the batch into the melt means that a significantly larger melt-down surface area is available to the batch during the "volume melting" which is brought about as a result than in the case of melting at the surface.

Furthermore, the inventors have discovered that the melt-down rate can also be increased if the batch is not placed on the surface of the melt in powder form, but rather is added to the melt in the form of pellets, with the pellets being stirred into the melt either by stirring, bubbling or a high level of convection.

Attempts have been made to place the batch onto the glass melt in the form of prefabricated pellets rather than in powder form and then to melt down these pellets in conventional glass melting tanks as well. In this context, one advantage of the pellets is considered to be that the pellets can be preheated using the hot air from the melting tank, which saves energy. In practice, however, introduction of the batch in the form of pellets has not gained widespread acceptance in conventional tanks, since the outlay involved in producing the pellets is just about as high as the expected energy saving achieved by the preheating of the pellets. Moreover, there is no great increase in the throughput resulting from the use of pellets in conventional tanks.

The reduced dusting of the batch is considered to be a further advantage of the pellets. However, with most industrial glasses dusting of the batch does not constitute a major problem, and consequently in this respect it is not worth pelletizing the batch.

Apart from a few exceptions, pelletizing of the batch has not hitherto gained widespread use even in the melting of optical glasses. With glasses which have a very high tendency to dusting, it may be appropriate to add the batch to the glass melt in the form of pellets despite the higher outlay.

However, the inventors have established that in an advantageous refinement of the method according to the invention for melting the batch in a melting unit with cooled walls, the melt-down rate can be increased very considerably by adding the batch in the form of pellets.

The introduction of pellets allows the high chemical reaction rate caused by the increase in temperature to be exploited to a much greater extent. Stirring in the batch in the form of pellets means that the batch in the melt is immediately surrounded by melt and the chemical reactions can start immediately. In combination with a convective flow, it is possible to advantageously ensure that the pellets constantly come into contact with new melt.

The increased chemical reaction rate at the higher melting temperature means that the pellets are completely melted down in the melting unit with intensive mixing.

If the batch is added quickly, as can be achieved with the high throughput made possible by the method according to the invention, dusting of the batch is also more significant than if the batch is added slowly, as is customary in conventional tanks.

Avoidance of dusting of the batch with direct heating of the melt using radiofrequency or alternating current is also advantageous because the dusting and evaporation products can be deposited and condensed on the cooled walls, and can consequently easily lead to electrical sparkovers.

Moreover, the inventors have discovered that when using units with cooled walls, such as for example skull crucibles, the heat loss via the cooled walls is dependent not only on the melt temperature but also on the type and thickness of the skull layer. If a crystalline layer is formed, the heat loss is considerably lower than if transparent glass layers are formed.

Furthermore, the inventors have discovered that the energy loss is greater with glasses with a high transmission of thermal radiation than in the case of glasses with a low transmission of thermal radiation. For example, the energy loss is lower in the case of colored glasses than in the case of transparent glasses.

According to the invention, it has proven advantageous, in particular in the case of melts with a high transmission of thermal radiation and/or vitreous transparent skull layers, for the cooled walls, for example the water-cooled metal tubes of a skull crucible, to have a surface which reflects thermal radiation. In this context, it is irrelevant whether the walls directly reflect heat or whether they have a layer or coating which reflects heat.

In addition to the method according to the invention and the apparatus, the invention also covers glasses and glass products which are preferably produced by the method according to the invention. Glasses or glass products produced in this way are distinguished by the fact that the ratio of $Sn^{2+}$ to $Sn_T$, where T denotes the total concentration, is between 0.20 and 0.70, preferably between 0.25 and 0.60, particularly preferably between 0.30 and 0.50.

The inventors have discovered that glasses or glass products in which the $Sn^{2+}/Sn_T$ ratio has a value of greater than 0.25, preferably greater than 0.35, particularly preferably greater than 0.45, are distinguished by particularly good properties in accordance with the invention.

BRIEF DESCRIPTION OF THE SEVERAL VIEWS OF THE DRAWINGS

The invention is explained in more detail below on the basis of examples and with reference to the accompanying drawings, in which:

FIGS. 1A to 1C show various views of an embodiment of an apparatus according to the invention with conductive heating of the melt.

DETAILED DESCRIPTION OF THE INVENTION

Figure 2:
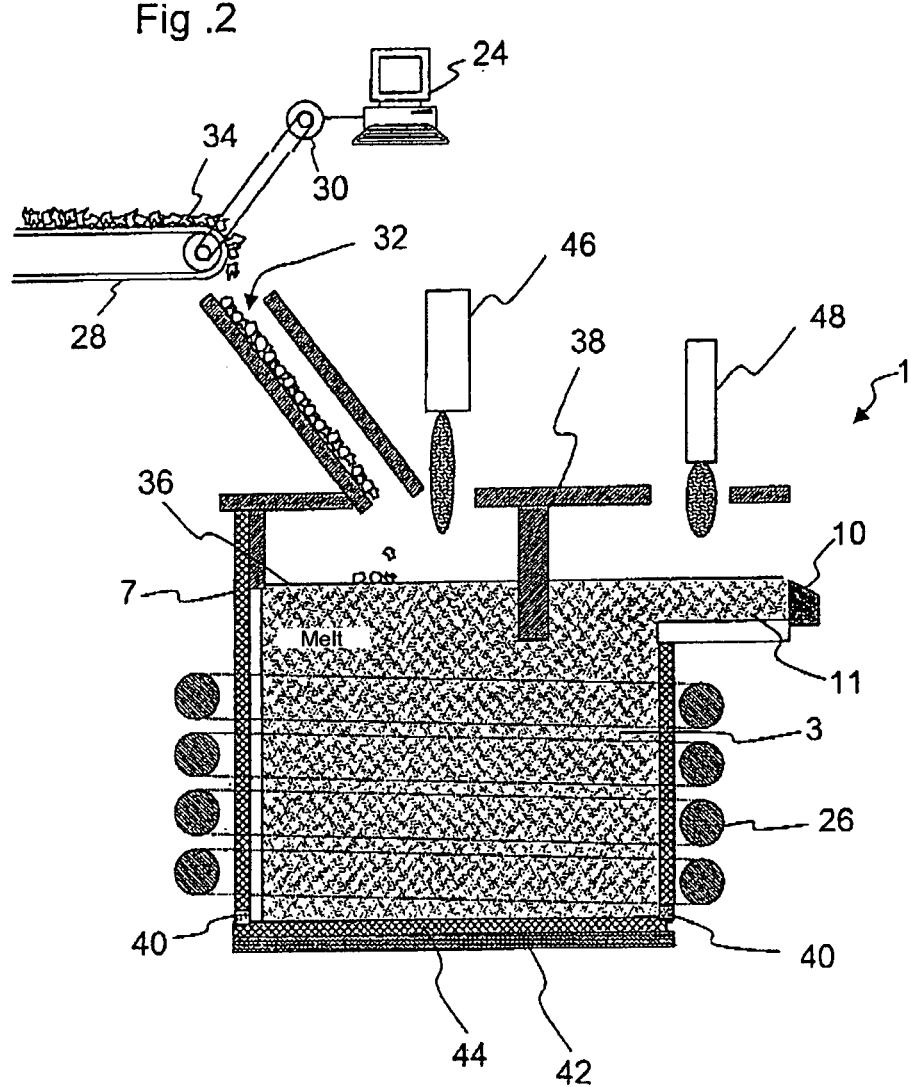
FIG. 2 shows a view of a further embodiment of the apparatus with inductive heating of the melt.

FIGS. 1A to 1C illustrate various views of a first embodiment of an apparatus according to the invention for melting inorganic materials. The apparatus is denoted overall by 1. FIG. 1B shows a view of the apparatus 1 as seen from the direction of arrow B in FIG. 1A. FIG. 1C shows a view as seen in the direction of arrow C in FIG. 1B. The apparatus 1 comprises a melting vessel 3 designed as a skull crucible. The crucible is made from tubes 7 through which coolant is passed to cool the vessel when the apparatus is operating. One suitable material for the tubes is copper, on account of its good thermal conductivity. However, on the other hand the strength of copper is not particularly high, which means that tubes made from metal with a high mechanical strength or thermal stability, in particular tubes made from high-strength or heat-resistant steel, may also be suitable.

To minimize the heat loss across the skull walls, the walls, i.e. in this embodiment of the apparatus the tubes of the skull crucible, may also be equipped with a surface which reflects thermal radiation. By way of example, the tubes 7 may for this purpose be provided with a platinum or gold coating, which may in particular also be polished, in order to increase the reflectivity. Rhodium, chromium, nickel or palladium, as well as alloys thereof, can also be used for this purpose.

To suppress reactions at the three-phase boundary which form at the edge of the melt bath surface adjoining the top furnace atmosphere, a refractory collar 13 is arranged on the crucible in the region of the melt bath surface. The collar projects laterally beyond the edge of the crucible. Moreover, the base of the collar is cooled. At the edge, the collar 13 is terminated by a refractory ceramic wall.

An inlet 9 and an outlet 10 with channels 11 for melting material are formed in the refractory collar, the inlet serving as a device for continuously supplying material to be melted, and the outlet serving as a device for continuously removing molten material, with melting material being supplied and discharged continuously through the inlet and outlet in the region of the melt bath surface of the melting vessel. Moreover, a bottom outlet 15, through which the crucible can be emptied, is provided at the bottom 14 of the melting vessel. Unlike in the embodiment shown in FIG. 1, it is also possible for the skull tubes to project out of the melt bath surface and to be, for example, plastic-coated at least in the region of the melt bath surface, in order to increase the chemical resistance. A suitable plastic is in particular Teflon.

At the side wall of this embodiment of the apparatus 1, two electrodes 5, as a device for conductively heating the melt, are arranged in corresponding cutouts in the side wall 16 of the melting vessel. The electrodes have coolant connections 6 as part of a device for cooling the electrodes, via which coolant is passed through passages in the interior of the electrodes. The electrodes 5 replace part of the side wall 16 of the melting vessel 3; moreover, the electrodes 5 are arranged opposite one another on the melting vessel. To keep the current density in the melt-contact material of the electrodes at a low level, the electrodes 5 maintain a large area. In this context, it is preferable for the electrodes 5 to replace at least 15% of the surface area of the wall of the melting vessel in the region of the melt.

To heat the melt, a heating current is passed through the melt via the electrodes 5, with the electrodes 5 being secured such that they are insulated from the melting vessel 3, so that it is impossible for any current to flow across the walls of the melting vessel, thereby reducing the heating capacity. In order still to protect against short circuits in the event of a defect in the insulation, it is moreover also possible for the wall elements of the melting vessel to be divided into segments which are insulated with respect to one another. Furthermore, the electrodes are arranged on the same sides of the apparatus 1 as inlet 9 and outlet 10 of the melt, so that the heating current between the electrodes flows substantially in or opposite to the direction of the main direction of flow of the melt.

The electrodes are of large-area dimension, so that the current which emerges from the electrodes into the melt does not exceed a current density of 5 A/cm² anywhere on the melt contact surface. The electrodes 5 are used to pass a heating current, preferably with an alternating current frequency in a range from 50 Hz to 50 kHz, particularly preferably with an alternating current frequency in a range from 2 kHz to 10 kHz, through the melt located in the melting vessel 3 by means of a device for generating alternating current.

Moreover, nozzles 18, which can be used to blow bubbling gas into the melt in order to additionally agitate the melt, are arranged in the base 14 of the crucible.

FIG. 1B additionally diagrammatically depicts a current supply 20 which supplies the electrodes 5 with the heating current for the melt. The current supply 20 is of controllable configuration, the control being effected by means of a program-controlled computer device 24. The computer device 24 records temperature measured values from one or more temperature sensors 22 and controls the heating current power of the current supply. The computer device, in combination with the temperature sensors 20, serves as a device for setting a suitable temperature, which is at least $T_{eff}-20\%$ to $T_{eff}+20\%$, in the melt, in order to allow energy-saving operation.

Moreover, the computer device 20, which is connected via suitable interfaces to a controllable device for delivering material to be melted, can also be used to suitably adapt the throughput such that the mean residence time in the unit is never shorter than the required mean residence time. Therefore, the computer device can advantageously also function as part of a device for adapting the relative throughput of material to be melted to the required residence time in the melt.

FIG. 2 shows a further embodiment of an apparatus 1 according to the invention. This embodiment likewise comprises a melting vessel 3 with metal tubes 7 designed as a skull crucible. The metal tubes 7 are secured to a baseplate via an electrical insulation 40. The baseplate of this embodiment of an apparatus 1 according to the invention comprises a first baseplate 44, on which a cooled, second baseplate 44, which has been slip-coated with quartzal is arranged, so that cooled walls are also present in the base region. Accordingly, all the wall components which are in contact with the melt are cooled, so that at least a region of the melt can be heated to above the limit use temperature of the materials of these wall components.

This embodiment of the apparatus 1 has an inductive heating device for heating the melt in the melting vessel 3. This device comprises an induction coil 26 which surrounds the melting vessel or the melt present in the melting vessel. As with the embodiment explained with reference to FIGS. 1A to 1C, there is an outlet 10 with outlet channel 11 as a device for the continuous removal of molten material.

Moreover, the apparatus 1 has a device for continuously supplying material to be melted. In the embodiment shown with reference to FIG. 2, this device comprises a conveyor belt 28, by which material to be melted, in the form of batch and/or charge cullet 34, is supplied through a feed opening 32 and placed onto the surface of the melt bath. A partition 38 prevents material to be melted which is floating on the melt bath surface and has not yet been melted down from being able to pass direct to the outlet 10, and thereby helps to maintain the required residence time of material to be melted in the melting vessel 3.

The speed at which the batch is added, and therefore the throughput or relative throughput, can be set or controlled by the conveyor speed of the conveyor belt 28. This control is effected via a program-controlled computer unit 24. The computer unit 24 in combination with the controllable drive 30 allows the rate at which material to be melted is introduced, and therefore also the throughput of the apparatus 1, to be adapted. The conveyor belt in combination with the drive 30 controlled by a computer unit 24 therefore also constitute a device for adapting the relative throughput to the required residence time of material to be melted in the melting unit or in the crucible 3.

In this context, it is also preferable for the power of the induction coil 26 to be controlled by the computer device in a similar way to the current power in the case of the conductive heating of the embodiment shown with reference to FIG. 1B, with the melt temperature being evaluated in order to set the melt temperature to a range from $T_{eff}$−20% to $T_{eff}$+20%.

In addition, a tank furnace burner 46 and an overflow burner 48 arranged above the outlet channel 11 are provided. These burners can be used in particular to melt down material to be melted in order to start up the apparatus 1, so that the material to be melted which has been melted down is coupled to the radiofrequency field of the coil 26.

In the text which follows, the invention is explained in more detail on the basis of examples.

Example 1

Energy Saving when Refining

The increase in the melting temperature both shifts the thermodynamic equilibrium and lowers the viscosity. The lowering of the viscosity leads to an increase in the rate at which the bubbles rise up and an increase in the diffusion rate of the gases in the melt.

By way of example, in the case of an $Li_2O$—$Al_2O_3$—$SiO_2$ glass-ceramic melt, it has been experimentally determined that increasing the temperature from 1700° C. to 1900° C. allows the throughput in a refining unit to be increased by at least a factor of 5 without any loss of quality.

The increase in temperature lowers the viscosity of the melt, and as a result increases the rate at which the bubbles rise up, by a factor of 5.

Furthermore, in the case of Redox refining, an $O_2$ overpressure is built up in the event of a rapid increase in temperature in the melt, and this $O_2$ overpressure is only gradually reduced again through the formation of bubbles and discharge of bubbles at low melting temperatures.

Figure 3:
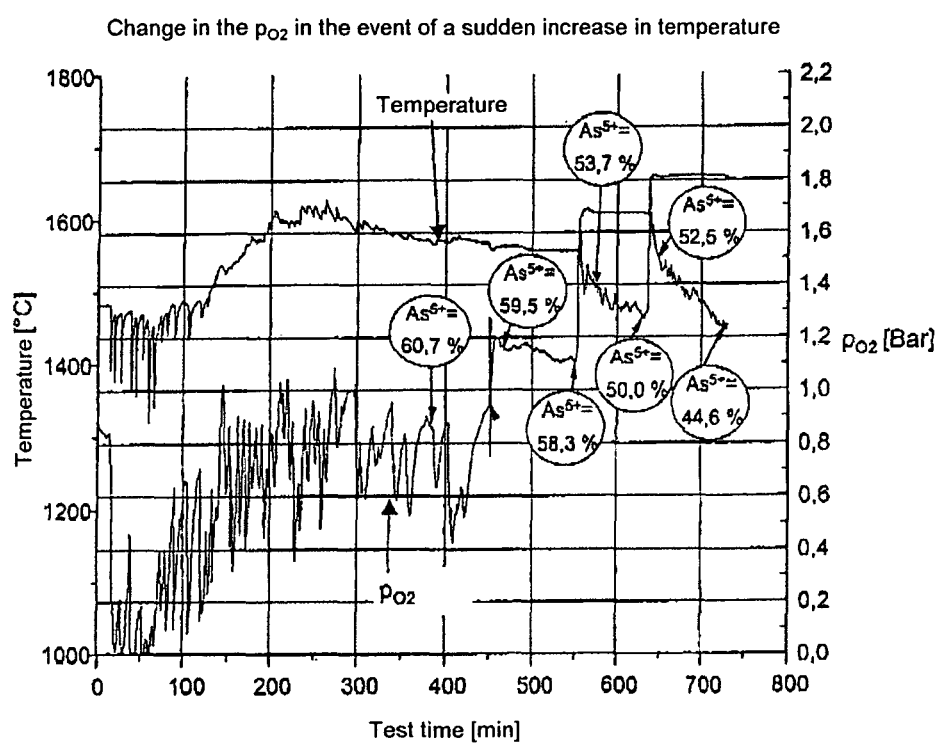
FIG. 3 shows a diagram plotting the temperature and the oxygen partial pressure $p_{O2}$ of a melt against time.

In this respect, FIG. 3 shows a diagram plotting the temperature (on the left) and the oxygen partial pressure $p_{O2}$ (on the right) for a melt against the test time.

In the test shown in FIG. 3, a batch was melted together with an $As_2O_3$ refining agent at 1550° C. and then successively heated to 1600° C. and 1650° C. With each increase in temperature, the $p_{O2}$ value initially increases very rapidly before gradually decreasing again. The $As_2O_5$ content also decreases as the temperature rises. The higher the melting temperature, the faster the decrease in the $p_{O2}$ value.

The considerable increase in temperature during refining on the one hand shifts the Redox equilibrium strongly in favor of the formation of $O_2$, with the result that the $p_{O2}$ pressure in the melt is greatly increased, which contributes to the formation of new or larger bubbles. On the other hand, the diffusion rate of the oxygen in the melt also increases, which leads to an acceleration in the diffusion of the oxygen into bubbles which are already present.

In addition to reducing the energy loss, the method according to the invention also has the advantage that it is possible to use the high-temperature refining agents described, for example, in DE 199 39 779.

For example, $SnO_2$ can particularly advantageously be used at refining temperatures of over 1700° C. The tin oxide, $SnO_2$, only releases the majority of oxygen at temperatures of over approximately 1700° C.

N. Shimatani "Fining methods without arsenic oxide for $Li_2O$—$Al_2O_3$—$SiO_2$ glass-ceramic" gives an $Sn^{2+}/Sn_T$ ratio of 0.05 at 1450° C.; 0.1 at 1525° C. and 0.15 at 1600° C. In this context, the index "T" denotes the total concentration.

The inventors' own tests carried out on a display glass revealed $Sn^{2+}/Sn_T$ values of 0.18 at 1600° C., 0.21 at 1650° C. and 0.24 at 1700° C. Moreover, the $Sn^{2+}/Sn_T$ ratio is to some extent also dependent on the glass composition. At high glass melt viscosities, the time required to establish the thermodynamic equilibrium also plays a crucial role. This explains the slightly different values for relatively similar glass compositions.

Surprisingly, the inventors have discovered that the energy loss through the water-cooled walls of a skull crucible does not rise exponentially, as would initially be expected, but rather only linearly, between 1700° C. and 2400° C.

Figure 4:
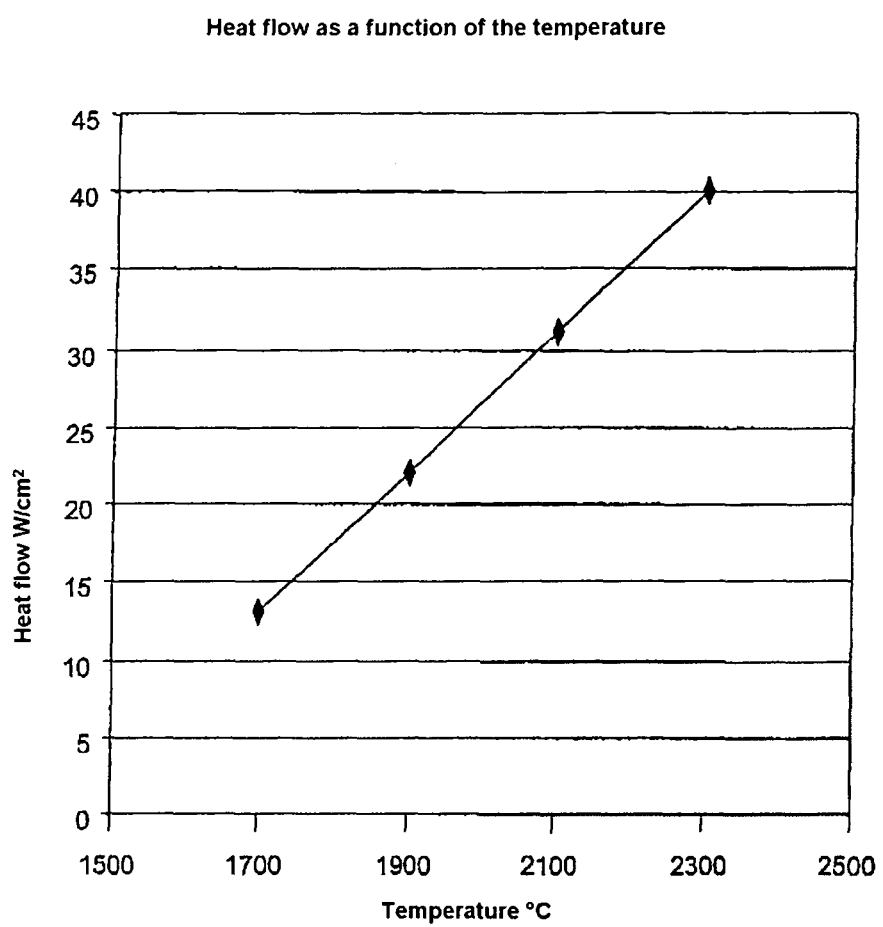
FIG. 4 shows a diagram plotting the heat flow through the skull wall in $W/cm^2$ as a function of the temperature of the melt.

In this respect, FIG. 4 shows a diagram plotting the heat flux j through the skull wall in W/cm² against the temperature of the melt. The heat flux through the walls of a skull crucible was measured for an $Li_2O$—$Al_2O_3$—$SiO_2$ glass-ceramic melt as a function of temperature above 1650° C. The measured values are listed in the table below:

T=1700° C. j=13 W/cm²
T=1900° C. j=22 W/cm²
T=2100° C. j=31 W/cm²
T=2300° C. j=40 W/cm²

The measured values plotted in the diagram shown in FIG. 4 clearly reveal that the flow of heat through the skull wall rises only linearly in the measured temperature range.

The inventors have discovered that, for example in the case of the heating of the glass melt of an $Li_2O$—$Al_2O_3$—$SiO_2$ glass-ceramic from 1700° C. to 1900° C. and refining of the glass melt at 1900° C., and with an increase in throughput by a factor of 5 in a 100 liter skull crucible, the energy demand per unit weight $E_{tot}$, including the greater energy loss through the water-cooled metal tubes of the skull crucible and the additional useful heat for further heating of the melt, is reduced by at least a factor of 2.5.

Experiment for Refining with a Constant Melt Volume

A 100 liter skull refining crucible is connected to a conventional ceramic melting-down unit. In a continuous process, 1000 kg of glass melt per day are refined in the 100 liter skull crucible. At 1700° C., the skull crucible has an energy loss of 153 kW across the water-cooled metal tubes. This results in a heat loss of 3672 kWh/d, or at a throughput of 1000 kg/d an energy loss per unit weight of 3.67 kWh/kg.

The glass melt is then heated from 1700° C. to 1900° C. in the skull crucible.

Approximately 300, 000 kJ or 83.4 kWh of useful heat are required to heat 1000 kg of glass melt from 1700° C. to 1900° C. (given a useful heat of 1.5 kJ/(kg*K)). Increasing the temperature from 1700° C. to 1900° C. increases the energy loss in the 100 liter skull crucible from 153 kW to approximately 258 kW, or from 3672 kWh/d to 6192 kWh/d.

The refining of 1000 kg of glass melt in a 100 liter skull crucible at 1900° C. requires
83.4+(6192−3672)=2603 kWh or 2.6 kWh/kg more than at 1700° C.

The acceleration in the establishing of the thermodynamic equilibrium and the increase in the rate at which bubbles rise up at 1900° C. by at least a factor of 5 compared to 1700° C., however, allows the throughput to be increased from 1000 kg/d at 1700° C. to 5000 kg/d at 1900° C. or allows the required residence time t to be shortened by a factor of 5, without any deterioration in the glass quality.

Then, a total of 417 kWh+6192 kWh=6609 kWh are required to refine the 5000 kg at 1900° C.; the 417 kWh represents the useful heat for the 5000 kg at in each case 83.4 kWh per 1000 kg. At the same time, the energy loss per unit weight $E_V$ was reduced from:
3.67 kWh/kg at 1700° C. to
6609 kWh/5000 kg=1.32 kWh/kg at 1900° C.

Consequently, increasing the temperature of the glass melt by just 200° C. allowed the energy consumption per unit weight $E_{tot}$ to be lowered by a factor of 3.67 kWh/kg/1.32 kWh/kg=2.78.

In general, the energy loss per unit weight of molten glass can be reduced by approximately a factor of 2.5 to 3 at a refining temperature of 1900° C. instead of 1700° C. with the skull crucible throughput increased by a factor of 5.

Experiment for Refining with a Constant Throughput

The inventors have also discovered that it is also possible to use a smaller melting unit with cooled walls at the higher melting temperature, rather than increasing the throughput.

As in the previous example, refining is carried out at 1700° C. in a 100 liter skull crucible. In this case, the energy loss from the 100 liter skull crucible is once again 153 kW or 3672 kWh/d. At a daily throughput of 1000 kg, the energy loss per unit weight is again 3.67 kWh/kg.

In a second test, the same daily throughput of 1000 kg is used, but refining is carried out in a significantly smaller skull crucible of just 20 liters at 1900° C. The quality of glass has not deteriorated compared to the 100 liter skull crucible which has been operated at 1700° C.

Once again, 83.4 kWh of useful heat are required to heat the 1000 kg of glass melt from 1700° C. to 1900° C. At 1900° C., the smaller skull crucible, with a capacity of 20 liters, has an energy loss of 90 kW or 2160 kWh/d, compared to an energy loss of 153 kW or 3672 for the 100 liter crucible at 1700° C. The energy consumption at 1900° C. in a 20 liter skull crucible is only 83.4 kWh+2160 kWh=2243 kWh or 2.24 kWh/kg.

Figure 5:
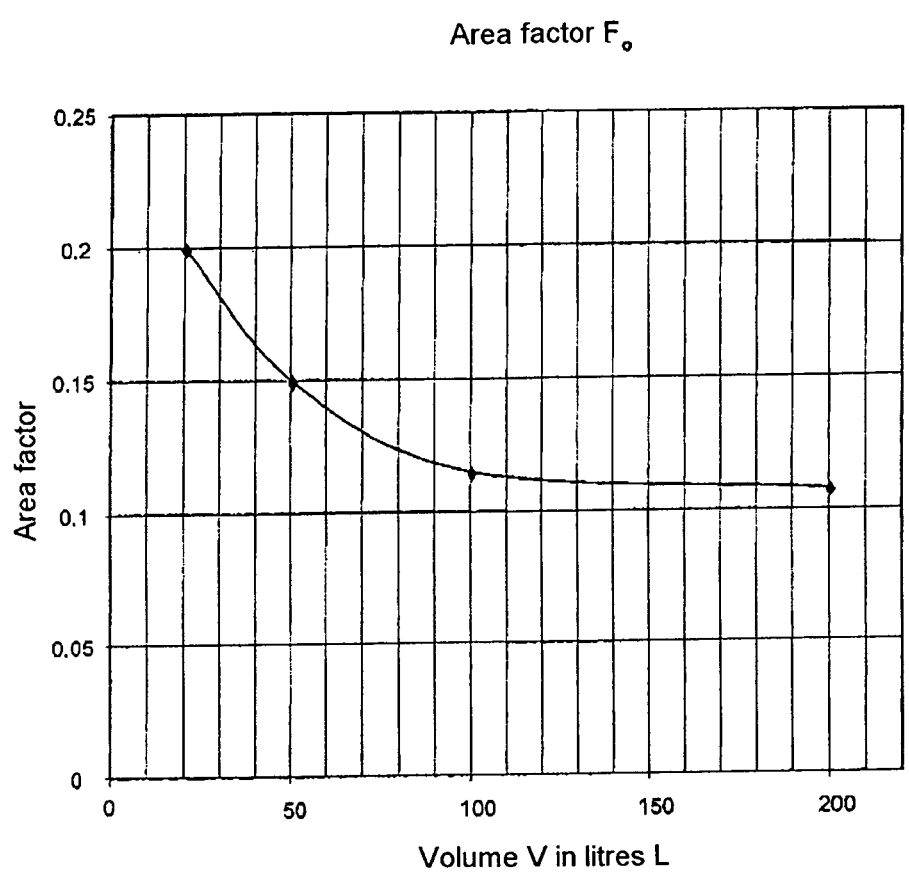
FIG. 5 shows a diagram plotting the area factor $F_0$ against the melt volume V.

Increasing the temperature and the use of the 20 liter crucible which is thus possible reduced the energy consumption/kg by a factor 3.67 kWh/kg/2.24 kWh/kg=1.64. The lower energy saving for a constant melt volume is attributable to the higher area factor $F_O$ (ratio of wall surface area to melt volume) with smaller crucibles. FIG. 5 plots the area factor $F_O$ against the melt volume.

If a 20 liter skull crucible at 1900° C. is used instead of a 100 liter skull crucible at 1700° C., the energy consumption per unit weight $E_{tot}$ drops by at least a factor of 1.5.

Example 2

Test for Determining $T_{eff}$

As has already been explained above, the energy consumption $E_{tot}$, i.e. the sum of energy loss per unit weight $E_V$ through the walls and the base and the useful heat per unit weight $E_N$ for heating the melt, passes through a minimum at $T_{eff}$, provided that the throughput is suitably adapted to the required residence time t.

The temperature $T_{eff}$ for the refining is estimated for a 700 liter skull crucible.

The calculation of the energy loss through the walls and the base as a function of the temperature is carried out with the aid of the diagram illustrated in FIG. 4.

The required residence time of the melt in the melting vessel or the increase in throughput as a function of temperature can be estimated in a first approximation on the basis of the increase in the rate at which the bubbles rise up. The rate at which the bubbles rise up v is calculated in accordance with the formula:

$$v=2/9*\rho*g*r^2*1/\eta$$

(V=rate at which the bubbles rise up; ρ=density of the glass melt; g=gravitational constant; r=radius of the bubbles; η=viscosity of the glass melt).

The density of the melt and the temperature dependency of the viscosity of the melt can be determined experimentally or extrapolated with the aid of the Vogel-Fulcher Tammann equation.

This estimation does not take into account the acceleration in the bubble buoyancy resulting from the increased convection at high temperatures or the change in the Redox equilibrium in the case of Redox refining.

The temperature dependency of the energy loss per unit weight $E_V$ is calculated from the temperature dependency of the heat loss and the temperature dependency of the required residence time of the melt in the melting volume.

The temperature dependency of the useful energy per unit weight $E_N$ is used at 0.42 Wh/(kg*K).

Figure 6:
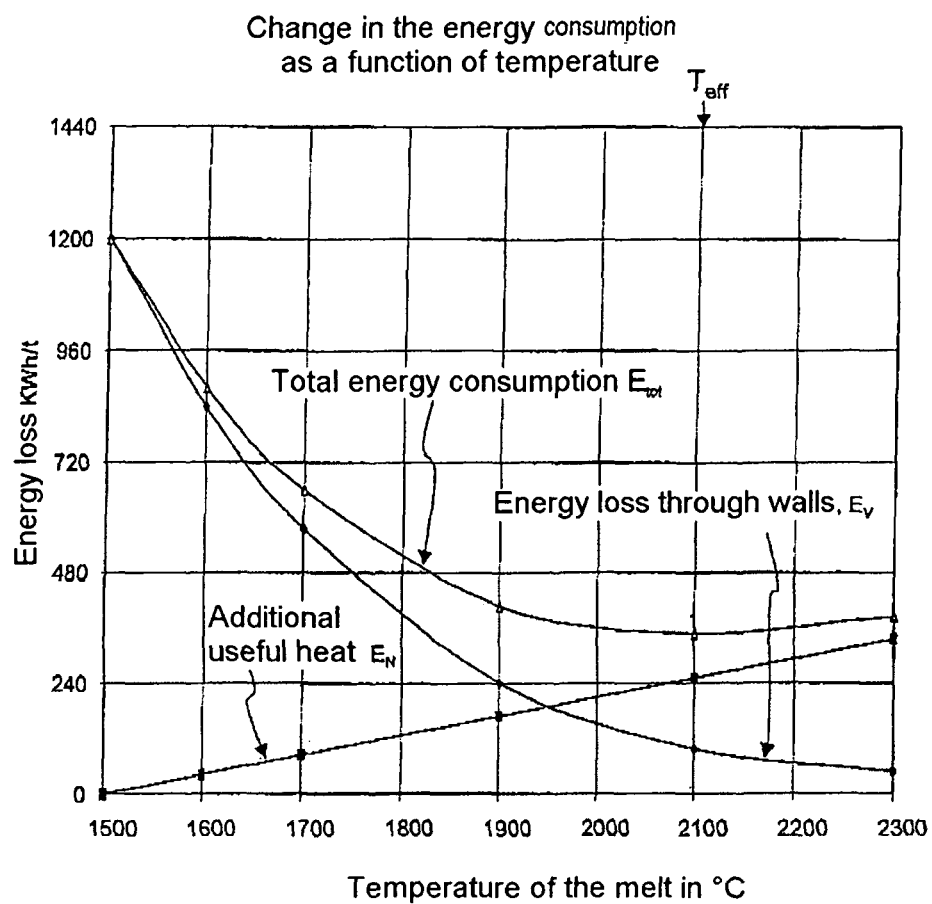
FIG. 6 shows a diagram plotting the energy per tonne for the energy loss through the walls of a melting unit, the useful heat and the total energy consumption as a function of the melting temperature, FIG. 7 uses a diagram to show the influence of additional measures for increasing the throughput on lowering the temperature $T_{\textit{eff}}$.

FIG. 6 shows the energy loss per unit weight $E_V$ through the walls of the melting unit and the additional useful heat per unit weight $E_N$ as a function of the melting temperature. The unit weight is in this case expediently given in tonnes and the energy in kilowatt hours. At approximately 1950° C., the energy loss per unit weight is approximately equal to the useful heat per unit weight required to increase the melting energy. The total energy consumption per unit weight $E_{tot}$ of the material to be melted passes through a minimum at 2100° C. or 2373° K.

The values shown in the graph in FIG. 6 are listed again in the table below:

TABLE 1

| Temperature [° C.] | Energy loss [kWh] | Through put [t/d] | Energy loss [kWh/t] | Useful heat [kWh/t] | Energy consumption [kWh/t] |
|---|---|---|---|---|---|
| 1 500 | 3 600 | 3 | 1 200 | 0 | 1 200 |
| 1 600 | 7 650 | 9 | 864 | 42 | 906 |
| 1 700 | 11 520 | 20 | 524 | 84 | 608 |
| 1 900 | 19 440 | 86 | 240 | 168 | 408 |
| 2 100 | 27 480 | 280 | 98 | 252 | 350 |
| 2 300 | 35 520 | 740 | 48 | 336 | 384 |

It can also be seen from Table 1 that the minimum for the energy consumption in this example is at approximately 2100° C. or 2377° K. This temperature corresponds to $T_{eff}$.

The energy loss/t or the energy loss per unit weight $E_V$ in this example at approximately 1950° C. reaches the same level as the additional useful energy/t or the useful energy per unit weight $E_N$ required to heat the melt from 1500° C. ($T_{kon}$) to 1950° C. At 1950° C., $E_V$=$E_N$.

Figure 7:
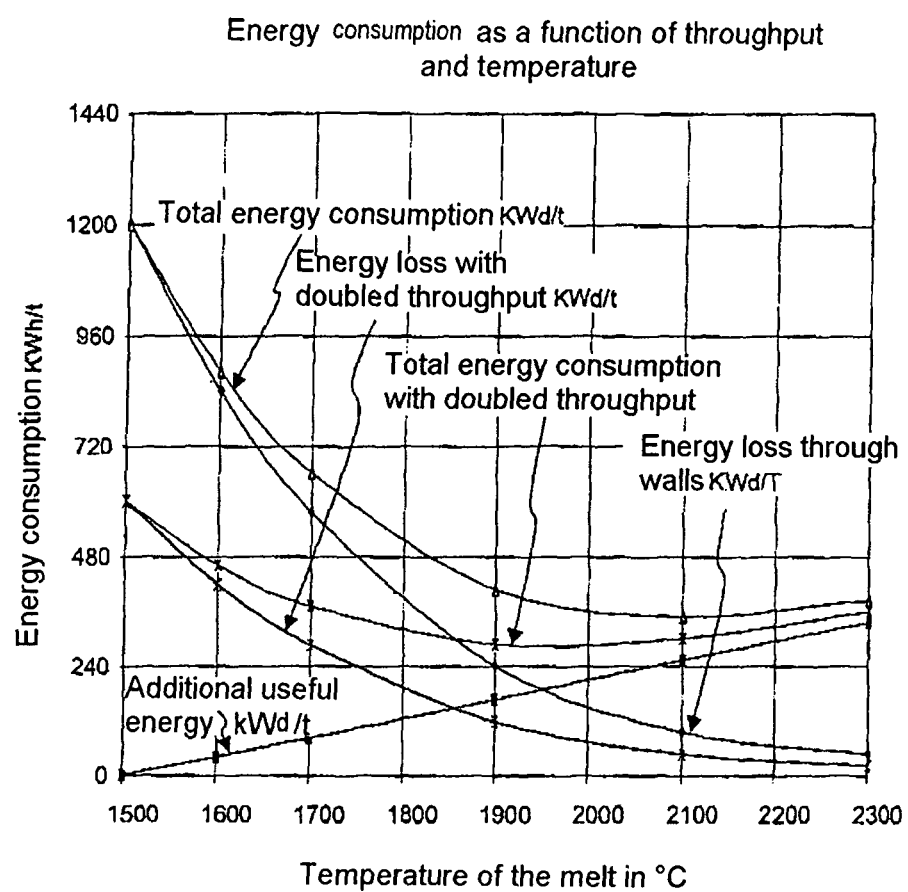

If it is possible by additional measures to increase the relative throughput, for example by a factor 2, in addition to the increase in temperature, the temperature $T_{eff}$ is reached at a lower melting temperature of approximately 1900° C., as can be seen from FIG. 7. Measures which can be used to increase the throughput accordingly in the refining operation have already been described above.

Example 3

Melting Down with a Constant Melt Volume

In a similar way to in the case of refining, the residence time of the melt in the melting unit when melting down batch can also be significantly reduced as the temperature rises, and consequently the throughput can be increased.

When melting down batch, $T_{eff}$ can once again be determined by means of the holding time t of the glass melt in the melting unit.

Figure 8:
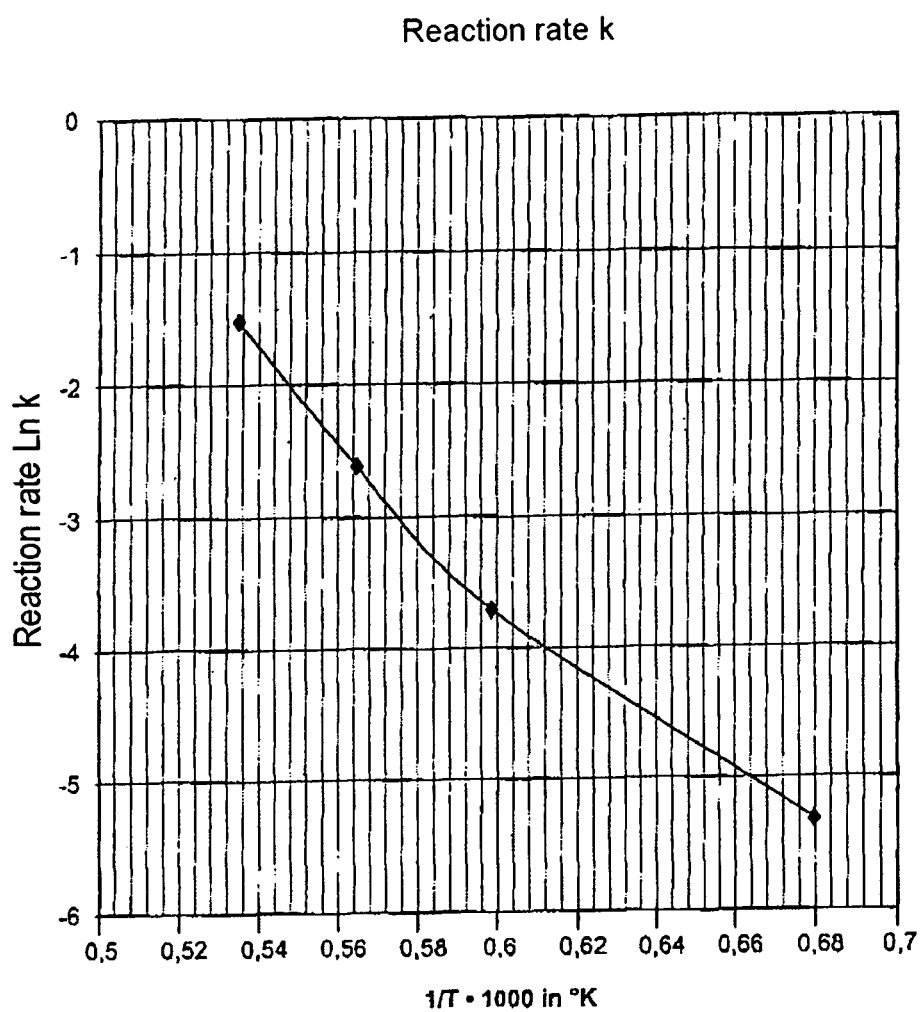
FIG. 8 shows a diagram of the reaction rate k for the dissolution of $SiO_2$ as a function of the temperature of the melt.

To determine the temperature dependency of the residence time t, FIG. 8 plots the Ln of the reaction rate k for the dissolution of $SiO_2$ against 1/T*1000 (in degrees Kelvin, ° K) of the melt. The activation energy for melting down the batch can be estimated from FIG. 8 since the $SiO_2$ is among the slowest of the constituents of the batch of the material to be melted to dissolve. It can be seen from FIG. 8 that the dissolution rate of the batch increases exponentially with the temperature. The rate at which $SiO_2$ melts increases by approximately a factor of 3 per 100 K. These values were measured on a glass for producing ampoules used for the pharmaceutical industry.

When melting down batch, $T_{\mathit{eff}}$ can likewise be shifted toward lower temperatures by additional measures for increasing the throughput.

Experiments have shown that above a temperature at which the viscosity of the melt is $<10^3$ dPas, preferably $<10^2$ dPas and the temperature difference between the melt at the cooled wall and the melt in the interior of the melt is >150 K, preferably >250 K, the melting-down rate in the melting unit rises suddenly.

Tests have shown that at a viscosity of the glass melt of $<10^3$, preferably $<10^2$ dPas, the high convection and the stronger shear forces increase the melting-down rate by a factor of 1.5 to 5 in addition to the higher melting-down rate caused by the temperature.

Furthermore, it has been found that mixing the melt using a stirrer or by bubbling allows the melting-down rate to be increased by a factor of 1.5 to 5, similarly to what is achieved by convection. Unlike in the case of convection, there is no threshold temperature or threshold viscosity when mixing with a stirrer or by bubbling.

The increase in the melting-down rate which is achieved by the use of pellets instead of powder is a factor of from 1.5 to approximately 6, depending on the particular batch. It has been found that stirring in pellets leads to faster melting of the batch than stirring in batch in powder form. It is rather difficult for batch in powder form to be quickly stirred into the melt. It has been established that batch in the form of pellets can be introduced and stirred into the melt most quickly.

The invention claimed is:

1. A method for melting inorganic materials at a melt temperature, comprising:
   introducing the inorganic materials into a melting unit with cooled walls and a base, the melting unit being a skull crucible, the inorganic materials in the melting unit forming a melt,
   determining a temperature $T_{\mathit{eff}}$ at which a sum of energy loss per unit weight of the melt through the cooled walls and the base, and a useful heat per unit weight to heat the melt passes through a minimum, wherein the sum is a function of the melt temperature and is determined on the condition that a throughput is adapted to a required residence time, and wherein the sum decreases as the melt temperature increases toward $T_{\mathit{eff}}$, passes through the minimum at $T_{\mathit{eff}}$, and increases at temperatures higher than $T_{\mathit{eff}}$,
   melting the inorganic materials at an operating melt temperature in a range from $T_{\mathit{eff}}$-20% to $T_{\mathit{eff}}$+20%, and
   selecting the throughput to be adapted to the required residence time at the operating melt temperature.

2. The method as claimed in claim 1, wherein the step of determining the temperature $T_{\mathit{eff}}$ comprises calculating the temperature $T_{\mathit{eff}}$ according to the formula:

$$\frac{dE_{tot}}{dT}\bigg|_{T=T_{\mathit{eff}}} = 0 = \frac{dE_N}{dT}\bigg|_{T=T_{\mathit{eff}}} + \frac{dE_V}{dT}\bigg|_{T=T_{\mathit{eff}}} \quad (1)$$

where $E_N$ denotes the useful heat per unit weight of the inorganic materials and $E_V$ denotes the energy loss per unit weight of the inorganic materials, the method further comprising controlling the melting unit so that the melt temperature is in the range from $T_{\mathit{eff}}$-20% to $T_{\mathit{eff}}$+20%.

3. The method as claimed in claim 2, wherein the useful heat per unit weight has a derivative according to temperature, the method comprising selecting the useful heat per unit weight according to the formula: $dE_N/dT=c_p$, where $c_p$ denotes a specific heat capacity of the melt.

4. The method as claimed in claim 2, wherein the energy loss per unit weight has a derivative according to temperature, the method comprising selecting the energy loss per unit weight according to the formula: $dE_V/dT=k\, F_0 1/\rho\tau_0 e^{+E/T} + kT F_0 1/\rho\tau_0(-E/T^2)e^{+E/T}$, where k denotes a total transfer of heat through the walls of the melting unit, $F_0=F/V$ denotes a surface to volume ratio of the melt, $\rho$ denotes a density of the melt, $\tau_0$ denotes the required residence time at a reference temperature $T_0$, and E denotes a constant corresponding to a characteristic activation temperature.

5. The method as claimed in claim 2, wherein the temperature of at least one region of the melt is selected to be less than or equal to a temperature at which the useful heat and the energy loss per unit weight are equal.

6. The method as claimed in claim 1, further comprising feeding thermal energy directly to the melt.

7. The method as claimed in claim 6, wherein the melt is additionally mixed in the melting unit.

8. The method as claimed in claim 7, wherein the melt is agitated using a stirrer and/or by bubbling.

9. The method as claimed in claim 7, further comprising generating a convective flow in the melt.

10. The method as claimed in claim 9, wherein the convective flow is produced by setting a viscosity of less than $10^3$ dPas and a melt temperature difference between an inner region of the melt and an outer region of the melt of greater than 150 K.

11. The method as claimed in claim 6, further comprising supplying the inorganic materials in the form of a batch, which is placed onto a surface of the melt.

12. The method as claimed in claim 11, wherein the batch is added in the form of pellets.

13. The method as claimed in claim 1, further comprising refining the melt.

14. The method as claimed in claim 13, further comprising producing a convective flow in the melt.

15. The method as claimed in claim 14, wherein the convective flow is produced by setting a viscosity of less than $10^2$ dPas and a melt temperature difference between an inner region of the melt and an outer region of the melt of greater than 250 K.

16. The method as claimed in claim 13, wherein the step of introducing the inorganic materials into the crucible comprises introducing the materials from one side of the crucible at a melt bath surface and discharging the melt on an opposite side at the melt bath surface.

17. The method as claimed in claim 1, wherein the inorganic materials are refined using a refining agent.

18. The method as claimed in claim 1, further comprising continuously feeding and removing the inorganic materials to and from the melt.

19. The method as claimed in claim 1, wherein the temperature $T_{\mathit{eff}}$ is determined for the melting-down of a batch.

20. The method as claimed in claim 19, wherein the temperature $T_{\mathit{eff}}$ is determined for a melt which is additionally mixed.

21. The method as claimed in claim 19, wherein the temperature $T_{\mathit{eff}}$ is determined for a melt which has a viscosity of less than $10^3$ dPas and is melted in a unit at which a temperature difference in the melt between an inner region of the melt and an outer region of the melt of greater than 150 K.

22. The method as claimed in claim 1, wherein the temperature $T_{eff}$ is determined for a melt which has a viscosity of less than $10^3$ dPas and is melted in a unit at which a temperature difference in the melt between an inner region of the melt and an outer region of the melt of greater than 150 K.

23. The method as claimed in claim 1, wherein the temperature $T_{eff}$ is determined for a melt in which molten material is introduced into a crucible from one side of the crucible at a melt bath surface and is discharged again on an opposite side of the crucible at the melt bath surface.

24. The method as claimed in claim 1, further comprising feeding thermal energy directly to the melt.

25. The method as claimed in claim 24, wherein the thermal energy is fed to the melt by direct conductive heating.

26. The method as claimed in claim 24, wherein the thermal energy is fed to the melt by direct inductive heating.

27. The method as claimed in claim 1, wherein at least one region of the melt is heated to more than 1700° C.

28. The method as claimed in claim 1, wherein the required residence time comprises a melt-down time.

\* \* \* \* \*